United States Patent [19]

Johnson et al.

[11] 4,434,059

[45] Feb. 28, 1984

[54] POLYMERS FOR PREVENTION OF FOULING BY IRON OXIDES IN COOLING SYSTEMS

[76] Inventors: Donald A. Johnson, Bolingbrook; Baker N. Nimry, Downers Grove, both of Ill.

[21] Appl. No.: 442,498

[22] Filed: Nov. 18, 1982

Related U.S. Application Data

[63] Continuation of Ser. No. 230,787, Feb. 2, 1981, abandoned.

[51] Int. Cl.³ .............................................. C02F 5/12
[52] U.S. Cl. ...................................... 210/701; 203/7; 252/180
[58] Field of Search ............... 210/701; 203/7, 57; 159/DIG. 13; 252/180

[56] References Cited

U.S. PATENT DOCUMENTS

| | | |
|---|---|---|
| 2,980,610 | 4/1961 | Ruehrwein . |
| 3,110,666 | 11/1963 | Hedley et al. . |
| 3,293,152 | 12/1966 | Herbert et al. .......................... 203/7 |
| 3,463,730 | 8/1969 | Booth et al. .......................... 252/180 |
| 3,514,736 | 5/1970 | Salutsky .................................. 203/7 |
| 3,549,548 | 12/1970 | Newman . |
| 4,072,607 | 2/1978 | Schiller et al. .......................... 203/7 |

FOREIGN PATENT DOCUMENTS 298540  5/1971  U.S.S.R. ............... 252/180

*Primary Examiner*—Benoît Castel
*Attorney, Agent, or Firm*—John G. Premo; Robert A. Miller; Donald G. Epple

[57] ABSTRACT

Industrial process cooling water systems are stabilized against iron precipitation by adding thereto an effective amount of an acrylic acid-acrylamide copolymer having specific weight ratios.

4 Claims, No Drawings

POLYMERS FOR PREVENTION OF FOULING BY IRON OXIDES IN COOLING SYSTEMS

This application is a continuation of application Ser. No. 230,787, filed Feb. 2, 1981, now abandoned.

The present invention relates to a method for preventing the deposition of iron oxide and/or iron salts on surfaces in contact with cooling water used in industrial process systems.

The problem associated with iron oxide and iron salts in industrial process water systems has long been recognized. U.S. Pat. No. 3,110,666 discusses the problem caused by iron salts in depth, especially in alkaline water systems. As pointed out in that reference, various solutions to this problem have been employed. Among materials suggested to prevent iron precipitation include hydrolyzed polyacrylonitrile such as that described in U.S. Pat. No. 3,110,666, polyacrylamide such as that described in U.S. Pat. No. 2,980,610, and low molecular weight hydrolyzed polyacrylonitrile such as that disclosed in U.S. Pat. No. 3,549,548, all of which are hereinafter incorporated by reference.

While treatments such as the above have met with some success, they have generally not produced the desired results, specifically in industrial cooling water systems using high hardness water. Applicants have found suprisingly, however, that specific copolymers of acrylamide and acrylic acid as well as homopolymers of acrylic acid having well defined molecular weight ranges can be employed to combat iron precipitation problems in these systems.

It is, therefore, an object of this invention to provide to the art a novel polymeric material and process which will inhibit the precipitation of iron oxide and/or iron salts from industrial process cooling water.

A further object of this invention is to provide to the art a specific copolymer and process useful for the prevention of iron oxide and iron salt precipitation upon the surfaces of industrial heat exchangers in contact with alkaline cooling waters.

Further objects will appear hereinafter.

THE ADDITIVES OF THE INVENTION

Applicants have, surprisingly, found that copolymers of acrylic acid and acrylamide and homopolymers of acrylic acid having from 75% by weight acrylamide and a molecular weight ranging from 5000 to 170,000, perform as iron dispersants in industrial cooling water systems. This is particularly surprising in view of the fact that hydrolyzed polyacrylonitrile materials having approximately the same molecular weight and hydrolyzed to correspond to 10–50% by weight acrylic acid, do not perform as well as the materials of this invention.

The copolymers of this invention may be prepared by various methods known to the art. Solution polymerization utilizing conventional red-ox catalyst systems is the preferred method. A particularly useful method for the preparation of polymers of this type is found in U.S. Pat. No. 4,062,764, which discloses a continuous tube reactor preparation method for material of this type.

As stated above, the copolymers of this invention contain from 10–50% by weight acrylic acid and/or its water-soluble alkali metal or ammonium salts and 50–90% by weight of acrylamide. A particularly optimum ratio is an acrylic acid to acrylamide ratio of 25:75. As stated above, molecular weight can range from 2000 to 170,000. Preferred molecular weights range from 5000 to 100,000 and, most preferably, from 5000 to 50,000. Particularly preferred materials employed in this invention have molecular weights of 5000 and 10,000 respectively.

The polymers which are the subject of this invention can be used in industrial alkaline cooling water systems at dosages proportional to the amount of iron present in the water. With higher addition levels of the polymers of this invention, greater amounts of iron are stabilized against precipitation. As such, it is difficult to quantify the amount of polymers to be utilized without first assessing the iron content of the water. Generally, however, the polymers of this invention be used it levels of from 0.5–100 ppm as 20% aqueous polymer solutions ppm of soluble iron contained in the water. Preferably of from 1.0–50 ppm of a 20% aqueous polymer solution will be utilized per ppm of soluble iron in the water, and most preferably from 5–15 ppm of the aqueous polymer solution per ppm of soluble iron in the water.

EXPERIMENTAL RESULTS

Previous test methods utilized for iron dispersancy have all used preformed colloidal particles of iron oxide. These types of tests overlook the ability of the additive to influence the precipitation process itself. The testing utilized to evaluate the polymers of this invention deliberately cause the formation of precipitate to occur in the presence of the additive and interfering ions.

The test method consists of a pH-static addition of ferric chloride solution to a test solution containing the additive to be tested and any other solutes necessary for a particular experiment. Precipitation rate was monitored throughout the addition by turbidity measurements and a mass balance calculated from the amount of ferric chloride added vs. the amount passing through a Millipore ® Filter of a various size. Colloids formed and the presence of some additives were so fine as to fall into a grey area of definition between colloidal suspensions and solutions. Therefore, the choice of what size particle represents precipitation was an experimental variable. Results of this test work are indicated below:

1. 75/25% acrylic acid-acrylamide polymer with a molecular weight greater than 24,000 gave turbidity in the presence of calcium ion before any $Fe+3$ was added. This indicated the formation of an insoluble calcium-polymer salt.

2. The activity of the polymer tested toward stabilization of iron hydroxide colloids was extinguished by the presence of calcium ion, probably due to the formation of insoluble polymer salts.

3. As the acrylic acid-acrylamide ratio and molecular weight drop, with an approximate optimum ratio of 25% acrylic acid/75% acrylamide and a molecular weight of 5300, two effects are observed:
   (a) The size of colloids formed up to a predictable level of added $Fe+3$ decreased to the point where light was no longer scattered, and
   (b) the interfering effect of calcium salts was substantially diminished.

In addition, the 25% acrylic acid/75% acrylamide polymer exhibited a well defined stoichiometry toward the amount of $Fe+3$ that could be maintained in a non-light scattering colloid.

When compared against the materials prepared by the hydrolysis of polyacrylonitrile having an approximate molecular weight of 100,000 (a commercially available material utilized as a boiler water iron dispersant) the polymers of the instant invention out-performed this material substantially. It appears that modification of the structure of the polymer can give a high performance iron dispersant having a linear relationship between soluble iron and required dosage.

EXAMPLE 1

This example shows results obtained in the absence of any additive. This experiment, run at pH 8, showed that iron precipitated as soon as it was added to the system in quantitative form, and that turbidity was very low due to the fact that all of the added iron precipitated. Turbidity measurements in this case were difficult due to the fact that ferric hydroxide coagulated and adhered to the sides of the reaction vessel. Results are shown in Table 1.

EXAMPLE 2

This example shows the use of several copolymers of acrylic acid and acrylamide having varying monomer ratios. Polymer dosage was 150 parts per million as a 20% aqueous polymer solution in all cases. Iron precipitation removal was accomplished by means of a 0.45 millimicron Millipore filter. As seen from the results in Table 2, copolymers of acrylic acid and acrylamide having higher ratios of acrylic acid to acrylamide performed satisfactorily in maintaining iron in solution. All experiments were conducted at a pH of 8.

EXAMPLE 3

This example shows the utilization of the same polymers employed in Example 2. Turbidity was the unit of measurement in this case (sealed to read in parts per million Fe+3) and polymers were utilized as 150 parts per million of a 20% aqueous solution. Results are given in Tables 3. From the results given in Table 3, the 25:75 acrylic acid:acrylamide copolymer having a molecular weight of approximately 10,000 kept turbidity to a minimum. This shows the effect of the materials of this invention as compared with those not as preferred in maintaining iron in solution in alkaline cooling waters.

EXAMPLE 4

This example shows the dispersion of Fe+3 by higher molecular weight copolymers of acrylic acid and acrylamide. Again, iron collected utilizing a 0.45 millimicron Millipore filter shows the effectiveness of copolymers claimed in this invention. Results are shown in Table 4.

EXAMPLE 5

This example shows the effect of the same polymers utilized in the previous example at the same level. Turbidity was the unit of measurement in this example. As seen from the data below, a 25:75 acrylic acid-acrylamide polymer having a molecular weight of 120,000 performed more satisfactory than those materials having higher ratios of acrylic acid. Results are shown in Table 5.

EXAMPLE 6

In order to show the effectiveness of this invention over conventional known dispersant materials, the use of lignosulfonates, 1,hydroxyethylidene 1-1 diphosphonic acid (Dequest 2010, available from the Monsanto Company) and potassium pyrophosphate were examined. It was found that these materials act as dispersants for precipitated iron but generally do not inhibit the formation of iron precipitates as do the polymers shown in this invention. Results of these tests are shown in Tables 6–11.

It is of interest to note that while the dequest 2010 can prevent loss of iron filtration, it does not prevent precipitation as indicated by the formation of turbidity at low levels or iron addition. This factor places the dequest 2010 and the other additives, including lignosulfonates and pyrophosphates, in the same class as the non-preferred polymers.

EXAMPLE 7

This example shows the effect of calcium on the dispersant activity and iron precipitation characteristics of a low-molecular weight copolymer of acrylic acid and acrylamide. While the 500 ppm of calcium utilized in these tests inhibited the effect of the polymers of this invention slightly, substantial activity was still noted. Other copolymers of acrylic acid and acrylamide not within the ranges shown by applicants were grossly affected. Effect of calcium was noted to be three-fold:

(1) Nearly complete extermination of the activity of materials acting through their dispersion mechanism was noted;

(2) Some reduction was found in the activity of additive materials acting as precipitation inhibitors such as those of the instant invention;

(3) Precipitation of the polymer itself occurred with high molecular weight polymers.

In reviewing the above data, it is indicated that the 75/25 copolymer of acrylic acid:acrylamide lost nearly all of its dispersive activity in the presence of 500 ppm calcium. The 50/50 and 25/75 polymers retained activity under these conditions. Comparison of data listed below in Table 12 with Table 13 shows that the 50/50 and 25/75 copolymer activity is made up entirely of precipitation inhibition components. Table 13 indicates that the 50/50 and 25/75 polymers were able to stabilize 10 and 14 parts per million of Fe+3 respectively by both the turbidity and filterability standards compared to the 25 and 27 ppm maximum which were obtained in the absence of calcium ion. Results are shown below in Tables 12–13.

EXAMPLE 8

This example shows the effect of calcium ion on high and intermediate molecular weight copolymers of acrylic acid-acrylamide having varying ratios of the comonomers. From the results indicated below, it is evident that the polymer when used at level of 150 ppm as a 20% aqueous solution in the presence of 500 ppm calcium ion at pH 8, precipitated and actually added to the turbidity found. Results are found in Tables 14–15.

EXAMPLE 9

The effect of various pH values on the precipitation inhibitive effect of a 25:75 acrylate:acrylamide copolymer having a molecular weight of 10,000 was examined. The activity of the additive is at its lowest value of pH 6 and goes through a maximum at pH 8 decreasing at pH 9. This may be due to the protonation of the polymer at low pH values. The polymer being a weak acid is more ionized and hence more active at high pH levels. This effect could be counteracted at very high pH's by decreased solubility of ferric hydroxide. When calcium ion is present, a peculiar interaction is found. At pH 6 addition of calcium has virtually no effect on the activity of the polymer. At higher pH values addition of any amount of calcium diminished the iron stabilization capacity of the polymer from 25 parts per million to approximately 12-15 parts per million.

EXAMPLE 10

The effect of polymer concentration was also investigated utilizing a 25/75 acrylate acrylamide copolymer having a molecular weight of 10,000. The level of polymer was varied in successive tests from 25 to 500 parts per million as a 20% aqueous solution of the polymer. This experiment showed that the amount of polymer added both in the presence and without the presence of calcium was directly related to the amount of iron stabilized in the water. At higher addition levels greater amounts of iron are stabilized. At lower amounts of polymer, lower amounts of $Fe^{+3}$ are stabilized. The slope of a line plotted with no calcium present was 0.1 ppm of the $Fe^{+3}$ to 1 ppm of the 20% polymer solution. The slope of the line with 500 ppm calcium present was 0.08 ppm $Fe^{+3}$ per ppm of the 20% aqueous polymer solution.

TABLE 1

| Total Iron Added (ppm) | Precipitated Iron (ppm) (Precipitated) | Precipitated Iron (ppm) (Turbidity) |
| --- | --- | --- |
| (Blank) | | |
| 2.2 | 2.2 | 0.5 |
| 5.0 | 5.0 | 1.0 |
| 10.0 | 10.0 | 1.2 |
| 15.0 | 15.0 | 0 |

TABLE 2

| | | Total Iron Added (ppm) | Precipitated Iron (ppm) |
| --- | --- | --- | --- |
| a. | 25:75 acrylic acid- | 10.0 | 0.0 |
| | acrylamide | 27.5 | 1.0 |
| | (Na salt) | 32.5 | 6.5 |
| | Molecular weight 10,000 | 36.0 | 32.5 |
| b. | 50:50 acrylic acid- | 5.5 | 0 |
| | acrylamide | 17.5 | 0 |
| | (Na salt) | 25 | 0.5 |
| | Molecular weight 5,300 | 42.5 | 26.5 |
| c. | 75:25 acrylic acid- | 10 | 0 |
| | acrylamide | 17.5 | 0 |
| | (Na salt) | 30 | 4 |
| | Molecular weight 10,000 | 41.5 | 31.75 |

TABLE 3

| | | Total Iron Added (ppm) | Turbidity (JTU) |
| --- | --- | --- | --- |
| a. | 25:75 acrylic acid- | 10 | 0 |
| | acrylamide | 27.5 | 1.7 |
| | (Na salt) | 32.5 | 11.3 |
| | Molecular weight 10,000 | 36 | 18.3 |
| b. | 50:50 acrylic acid- | 5.5 | 0 |
| | acrylamide | 17.5 | 1.7 |
| | (Na salt) | 25 | 8.1 |
| | Molecular weight 5,300 | 42.5 | 35.5 |
| c. | 75:25 acrylic acid- | 10 | 3.8 |
| | acrylamide | 17.5 | 10.9 |
| | (Na salt) | 30 | 25.8 |
| | Molecular weight 10,000 | 41.25 | 38.8 |

TABLE 4

| | | Total Iron Added (ppm) | Precipitated Iron (ppm) |
| --- | --- | --- | --- |
| a. | 25:75 acrylic acid- | 8 | 0.4 |
| | acrylamide | 15.5 | 1.0 |
| | (Na salt) | 20.0 | 16.9 |
| | Molecular weight 120,000 | | |
| b. | 50:50 acrylic acid- | 5 | 1.5 |
| | acrylamide | 12.5 | 1.0 |
| | (Na salt) | 20 | 5.5 |
| | Molecular weight 170,000 | 26 | 23.1 |
| c. | 75:25 acrylic acid- | 7.5 | 0.5 |
| | acrylamide | 17.5 | 4.0 |
| | (Na salt) | 25.5 | 21.3 |
| | Molecular weight 120,000 | 32.5 | 31.4 |

All of the polymers were utilized at a dosage of 150 ppm as 20% aqueous solutions.

TABLE 5

| | | Total Iron Added (ppm) | Turbidity (JTU) |
| --- | --- | --- | --- |
| a. | 25:75 acrylic acid- | 8.0 | 0 |
| | acrylamide | 15.5 | 3.9 |
| | (Na salt) | 20 | 10.8 |
| | Molecular weight 120,000 | | |
| b. | 50:50 acrylic acid- | 5 | 0.8 |
| | acrylamide | 12.5 | 5.4 |
| | (Na salt) | 20 | 12.6 |
| | Molecular weight 170,000 | 26 | 18.9 |
| c. | 75:25 acrylic acid- | 7.5 | 2.4 |
| | acrylamide | 17.5 | 9.6 |
| | (Na salt) | 25.5 | 15.45 |
| | Molecular weight 120,000 | 32.5 | 19.8 |

All of the polymers were utilized at a dosage of 150 ppm as 20% aqueous solutions.

TABLE 6

| Results by Filtration | Total Iron Added (ppm) | Precipitated Iron (ppm) |
| --- | --- | --- |
| 1 hydroxyethylidene 1,1-diphosphonic acid | 2.5 | −.2 |
| 3.0 ppm | 5.0 | 5.0 |
| 10.0 ppm | 3.5 | −.1 |
| | 10 | 4.7 |
| | 15.2 | 14.5 |
| 30 ppm | 5.0 | 0.1 |
| | 17.5 | 2.0 |
| | 22.5 | 3.25 |
| | 36.6 | 34.6 |

TABLE 7

| Results by Turbidity | Total Iron Added (ppm) | Turbidity (JTU) |
| --- | --- | --- |
| 1 hydroxyethylidene 1,1-diphosphonic acid | 2.5 | 0 |
| 3 ppm | 5.0 | 2.5 |
| 10 ppm | 3.5 | 0 |
| | 10 | 3.75 |
| | 15.2 | 6.75 |
| 30 ppm | 5.0 | 0 |
| | 17.5 | 2.85 |
| | 22.5 | 9.45 |
| | 36.6 | 33.3 |

TABLE 8

| Results by Filtration | | |
| --- | --- | --- |
| | Total Iron Added (ppm) | Precipitated Iron (ppm) |
| $K_4P_2O_7$ −10 ppm | 3.5 | −.35 |

TABLE 8-continued

Results by Filtration

|  | Total Iron Added (ppm) | Precipitated Iron (ppm) |
|---|---|---|
|  | 10.0 | .7 |
|  | 14.4 | 13.85 |
| 20 ppm | 5 | −.05 |
|  | 10 | .2 |
|  | 17.5 | 1.0 |
|  | 22.5 | 1.5 |

TABLE 9

Results by Turbidity

|  | Total Iron Added (ppm) | Turbidity (JTU) |
|---|---|---|
| K$_4$P$_2$O$_7$  10 ppm | 3.5 | 0 |
|  | 10.0 | 2.8 |
|  | 14.4 | 8.46 |
| 20 ppm | 5.0 | 0 |
|  | 10 | .6 |
|  | 17.5 | 6.6 |
|  | 22.5 | 13.8 |

TABLE 10

Results by Filtration

|  | Total Iron Added (ppm) | Precipitated Iron (ppm) |
|---|---|---|
| Sodium lignosulfonate 10 ppm | 1.5 | −.7 |
|  | 4.0 | 3.2 |
|  | 6.5 | 5.95 |
| 75 ppm | 3.0 | −.2 |
|  | 12.5 | 2.3 |
|  | 20 | 14.7 |
|  | 27.3 | 25.7 |
| 150 ppm | 5.0 | −.5 |
|  | 15.0 | 0 |
|  | 30.0 | 4 |
|  | 55.0 | 51.5 |

TABLE 11

Results by Turbidity

|  | Total Iron Added (ppm) | Turbidity (JTU) |
|---|---|---|
| Sodium lignosulfonate 10 ppm | 1.5 | 0 |
|  | 4 | 2.1 |
|  | 6.5 | 4.5 |
| 75 ppm | 3.0 | 0 |
|  | 12.5 | 4.2 |
|  | 20 | 12.9 |
|  | 27.3 | 24.5 |
| 150 ppm | 5 | .1 |
|  | 15 | 2.1 |
|  | 30 | 10.1 |
|  | 55 | 33.8 |

TABLE 12

|  | Total Iron Added (ppm) | Precipitated Iron (ppm) |
|---|---|---|
| a. 25:75 acrylic acid-acrylamide (Na salt) Molecular weight 10,000 | 10 | .7 |
|  | 17.5 | 3.0 |
|  | 20.5 | 13.0 |
| b. 50:50 acrylic acid-acrylamide (Na salt) Molecular weight 5,300 | 7.5 | 0 |
|  | 15 | 0 |
|  | 21 | 19.75 |
| c. 75:25 acrylic acid-acrylamide (Na salt) Molecular weight 10,000 | 5 | 2 |
|  | 12.5 | 9.5 |
|  | 16 | 15.2 |

TABLE 12-continued

|  | Total Iron Added (ppm) | Precipitated Iron (ppm) |
|---|---|---|
|  | 10,000 |  |

All of the polymers were utilized at a dosage of 150 ppm as 20% aqueous solutions.

TABLE 13

|  | Total Iron Added (ppm) | Turbidity (JTU) |
|---|---|---|
| a. 25:75 acrylamide-acrylic acid (Na salt) Molecular weight 10,000 | 10 | 0 |
|  | 17.5 | 4.3 |
|  | 20.5 | 16.4 |
| b. 50:50 acrylamide-acrylic acid (Na salt) Molecular weight 5,300 | 7.5 | 0 |
|  | 15 | 6.2 |
|  | 21 | 21.6 |
| c. 75:25 acrylamide-acrylic acid Na+ Molecular weight 10,000 | 5.0 | 8.1 |
|  | 12.5 | 21.6 |
|  | 16 | 30 |

Contains 500 ppm Ca+2
All of the polymers were utilized at a dosage of 150 ppm as 20% aqueous solutions.

TABLE 14

|  | Total Iron Added (ppm) | Turbidity (JTU) |
|---|---|---|
| a. 25:75 acrylic acid-acrylamide (Na salt) Molecular weight 120,000 | 5 | 0 |
|  | 12.5 | 7.8 |
|  | 16 | 16.9 |
| b. 50:50 acrylic acid-acrylamide (Na salt) Molecular weight 170,000 | 5 | 2.2 |
|  | 10 | 9.45 |
|  | 14 | 21 |
| c. 75:25 acrylic acid-acrylamide (Na salt) Molecular weight 10,000 | 0.0 | 28 |
|  | 2.5 | 32 |

Contains 500 ppm Ca+2
All of the polymers were utilized at a dosage of 150 ppm as 20% aqueous solutions.

TABLE 15

|  | Total Iron Added (ppm) | Turbidity (JTU) |
|---|---|---|
| a. 25:75 acrylic acid-acrylamide (Na salt) Molecular weight 27,000 | 5 | 0.0 |
|  | 10 | 0.0 |
|  | 17.5 | 6.5 |
| b. 50:50 acrylic acid-acrylamide (Na salt) Molecular weight 31,000 | 2.5 | .2 |
|  | 7.5 | 3.3 |
|  | 15 | 20.7 |
| c. 75:25 acrylic acid-acrylamide (Na salt) Molecular weight 120,000 | 0.0 | 4.2 |
|  | 2.5 | 9.3 |
|  | 6.0 | 16.5 |
|  | 8.4 | 23 |

Contains 500 ppm Ca+2
All of the polymers were utilized at a dosage of 150 ppm as 20% aqueous solutions.

Having thus described the beneficial effect of the additives of this invention, we claim:

1. A method for the stabilization of water containing iron and calcium ions said water being utilized in an industrial process cooling system operating at a pH of from 6–11, which comprises adding to the water containing iron and calcium ions an effective amount of a copolymer of acrylic acid and acrylamide having a molecular weight of approximately 10,000 the ratio of acrylic acid to acrylamide being 25:75 on a weight basis.

2. The method of claim 1 wherein the iron contained in the water is in the form of $Fe+3$.

3. The method of claim 2 wherein the water containing $Fe+3$ is generated by the oxidation of $Fe+2$ contained in ground water.

4. The method of claim 1 wherein the industrial process cooling system is an open recirculating system.

* * * * *

UNITED STATES PATENT AND TRADEMARK OFFICE
CERTIFICATE OF CORRECTION

PATENT NO. : 4,434,059
DATED : FEBRUARY 28, 1984
INVENTOR(S) : DONALD A. JOHNSON and BAKER N. NIMRY It is certified that error appears in the above-identified patent and that said Letters Patent are hereby corrected as shown below:

FRONT PAGE, PLEASE ADD -- ASSIGNEE: NALCO CHEMICAL COMPANY, OAK BROOK, ILLINOIS--

Signed and Sealed this

Eighth Day of May 1984

[SEAL]

Attest:

GERALD J. MOSSINGHOFF

Attesting Officer

Commissioner of Patents and Trademarks